(12) United States Patent
Qiao et al.

(10) Patent No.: US 7,701,848 B2
(45) Date of Patent: Apr. 20, 2010

(54) EFFICIENT TRAP AVOIDANCE AND SHARED PROTECTION METHOD IN SURVIVABLE NETWORKS WITH SHARED RISK LINK GROUPS AND A SURVIVABLE NETWORK

(76) Inventors: Chunming Qiao, 8186 Melissa Renee Ct., Williamsville, NY (US) 14228; Dahai Xu, 1814 Rivendell Way, Edison, NJ (US) 08817; Yizhi Xiong, 1645 Marina Ct., Apt. D, San Mateo, CA (US) 94403

( * ) Notice: Subject to any disclaimer, the term of this patent is extended or adjusted under 35 U.S.C. 154(b) by 1517 days.

(21) Appl. No.: 10/887,799

(22) Filed: Jul. 9, 2004

(65) Prior Publication Data

US 2005/0031339 A1 Feb. 10, 2005

Related U.S. Application Data

(60) Provisional application No. 60/486,478, filed on Jul. 11, 2003.

(51) Int. Cl.
*G01R 31/08* (2006.01)
(52) U.S. Cl. .................................................. 370/228
(58) Field of Classification Search .............. 370/216, 370/252, 253, 353, 401
See application file for complete search history.

(56) References Cited

U.S. PATENT DOCUMENTS

| 6,195,553 | B1 * | 2/2001 | Claffery et al. ............. 455/445 |
| 7,099,286 | B1 * | 8/2006 | Swallow ..................... 370/255 |
| 7,200,105 | B1 * | 4/2007 | Milliken et al. ............. 370/216 |
| 2002/0112072 | A1 * | 8/2002 | Jain ........................... 709/239 |
| 2003/0063613 | A1 * | 4/2003 | Carpini et al. .............. 370/401 |
| 2005/0111349 | A1 * | 5/2005 | Vasseur et al. ............. 370/216 |
| 2005/0201276 | A1 * | 9/2005 | Sinha ......................... 370/225 |
| 2007/0297326 | A1 * | 12/2007 | Attarwala et al. ........... 370/223 |

OTHER PUBLICATIONS

Hu, J.Q., "Diverse Routing in Optical Mesh Networks," *IEEE Transactions on Communications*, 2003, 1-15.

* cited by examiner

*Primary Examiner*—Kwang B Yao
*Assistant Examiner*—Tung Q Tran
(74) *Attorney, Agent, or Firm*—Woodcock Washburn LLP (57) ABSTRACT

An efficient trap avoidance and shared protection method in a survivable network with shared risk link groups. The invention includes a fast and efficient heuristic algorithm for avoiding traps, an algorithm, which may also be applied effectively to shared SRLG protection. Compared to other existing algorithms, the algorithm embodied in the present invention runs much faster, and yet falls into few traps, and achieves a much higher bandwidth efficiency. This technology can be applied to MPLS, ATM, SONET, WDM, and other high-speed survivable network designs.

33 Claims, 9 Drawing Sheets

EFFICIENT TRAP AVOIDANCE AND SHARED PROTECTION METHOD IN SURVIVABLE NETWORKS WITH SHARED RISK LINK GROUPS AND A SURVIVABLE NETWORK

CROSS-REFERENCE TO RELATED APPLICATIONS

This application claims the benefit under 35 U.S.C. §119(e) of U.S. Provisional Application No. 60/486,478, filed Jul. 11, 2003.

FIELD OF THE INVENTION

The present invention relates generally to a trap avoidance and shared protection method in a survivable network with shared risk link groups.

BACKGROUND OF THE INVENTION

Shared Risk Link Group (SRLG) has been widely recognized as an important concept in survivable optical networks by the industry. Both standardization documents and commercial products are incorporating SRLG-aware components. However, SRLG-related problems of theoretical interest have only recently attracted the attention of the research community, and some of them have not been explored fully. More specifically, there are two major issues that are still open: avoiding "traps" (to be defined later) in path determination, and maximizing bandwidth sharing. These issues are more challenging in providing shared SRLG protection than in providing shared path protection without considering SRLGs.

Dense Wavelength Division Multiplexing (DWDM) is a promising technology to accommodate the explosive growth of Internet and telecommunication traffic. Because of the large amount of traffic a fiber carries, a single failure may cause a severe service loss. Hence, survivability is a critical problem in network design. To protect a mission-critical connection from a single link (node) failure, a straightforward solution is to choose a link (node) disjoint pair of active path (or AP, also called working path or primary path) and backup path (or BP, also called secondary path) from a source (ingress) node to a destination (egress) node. Such a scheme is failure-independent and this scheme can realize fast restoration by eliminating route computation in case of failure. In addition, bandwidth usage efficiency can be improved by using shared path protection, which allows a new BP to share the bandwidth allocated to some existing BPs on common links if their APs do not fail at the same time.

The concept of Shared Risk Link Group (SRLG) has been proposed as the fundamental input for failure management in the Generalized Multi-Protocol Label Switching (GMPLS) control plane. An SRLG is a group of network links that share a common physical resource (cable, conduit, node or sub-structure) whose failure will cause the failure of all links of the group. In general, the information on SRLGs are obtained manually by the network operator with the knowledge of the physical fiber plant of the network, although some SRLGs auto-discovery schemes have been proposed.

SRLG is an important component in survivable network design. In order to provide the failure-independent protection to a client (e.g., IP, ATM) connection from any single SRLG failure, a pair of SRLG-disjoint paths (AP and BP) for each client connection should be determined. That is, links allowing AP must not share any common SRLGs with links along the corresponding BP.

Figure 1A:
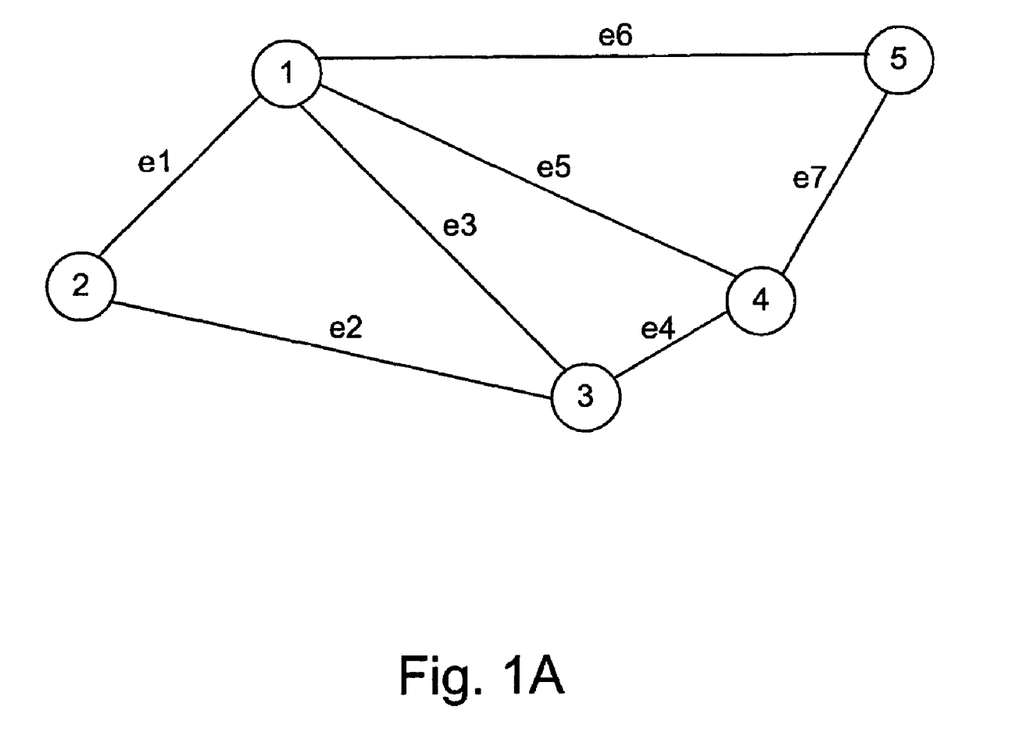
FIG. 1(a) illustrates an optical layer of an optical network.

FIG. 1(a) illustrates an optical layer of an optical network. In general, an optical network has a layered architecture. In the following discussion, a typical optical network is classified into two layers: an optical layer and a physical layer, as shown in FIG. 1a. The physical layer includes fiber spans (e.g., cable, conduit, etc.) and fiber span nodes. And the optical layer consists of optical links and nodes (a subset of the nodes in the physical layer) where Optical Cross-connects (OXC) or Optical Add/Drop Multiplexer (OADM) locate. An optical link in the optical layer is a connection in the physical layer, which may traverse over several fiber spans and/or fiber span nodes. At the same time, several optical links may pass through the same fiber span. Therefore, a single failure in the physical layer can cause multiple optical link failures. If we treat each fiber span as an SRLG, then a single SRLG failure may result in multiple optical link failures.

Since a fiber can traverse several conduits, a network link may belong to several SRLGs. Finding a pair of SRLG disjoint paths will be more complicated than finding a link/node-disjoint path (the latter may be considered as a special case as each link or the set of links incident upon each node could be what we call a "trivial SRLG"). In fact, the former is an NP-complete problem, while the later has a polynomial time solution.

To date, only a few Integer Linear Programming (ILP) and heuristic algorithms have been proposed to find SRLG disjoint paths. In shared SRLG failure-independent protection, or shared SRLG protection for short, the objective is to find a pair of SRLG-disjoint paths for a given request such that the total bandwidth consumption is minimized, taking into consideration that the two or more BPs can share backup bandwidth (called BBW) as long as their corresponding APs do not fail at the same time. In addition, the problem of online shared SRLG protection also need to be considered.

As expected, an ILP-based solution to the shared SRLG protection problem is extremely time-consuming and becomes infeasible for a large network size and/or a large number of SRLGs. Accordingly, heuristics such as Active Path First (APF), which finds an AP first, followed by a SRLG-disjoint BP, are attractive alternatives. The major challenge in using the APF heuristic, however, is that once an AP is found, one may not be able to find an SRLG-disjoint BP (even though a pair of SRLG-disjoint paths does exist). This is the so-called trap problem, which is rarely present when finding link/node-disjoint paths using APF, but can occur much more frequently (e.g., 10% to 30% in a typical network) when finding SRLG-disjoint paths using APF. To our knowledge, no effective algorithms have been proposed so far to address the trap problem, especially in conjunction with shared SRLG protection.

What is needed, then, is a fast and efficient heuristic algorithm for avoiding traps, an algorithm which may also be applied effectively to shared SRLG protection. This patent addresses issues related to both shared protection and trap avoidance jointly in survivable networks with SRLG consideration. Compared to other existing algorithms, the algorithm embodied in the present invention runs much faster, and yet falls into few traps, and achieves a much higher bandwidth efficiency. This technology can be applied to MPLS, ATM, SONET, WDM, and other high-speed survivable network designs.

SUMMARY OF THE INVENTION

The present invention broadly comprises an method for efficient trap avoidance and shared protection method in a survivable network with shared risk link groups. The invention includes a fast and efficient heuristic algorithm for avoiding traps, an algorithm, which may also be applied effectively to shared SRLG protection. Compared to other existing algorithms, the algorithm embodied in the present invention runs much faster, and yet falls into few traps, and achieves a much higher bandwidth efficiency. This technology can be applied to MPLS, ATM, SONET, WDM, and other high-speed survivable network designs.

A general object of the invention is to provide an efficient trap avoidance method that runs much faster than other known methods.

Another object of the invention is to provide an efficient trap avoidance method that also provides higher bandwidth efficiency, (nearly as high as, and sometimes even better than ILP-based schemes).

Finally, a further object of the invention is to provide a more scalable, polynomial time algorithm feasible for large SRLG networks.

These and other objects, features and advantages of the present invention will become readily apparent to those having ordinary skill in the art upon reading the following detailed description of the invention in view of the drawings.

DETAILED DESCRIPTION OF THE PREFERRED EMBODIMENT

The following acronyms are used in the detailed description of the present invention:
SRLG: Shared Risk Link Group
GMPLS: Generalized Multi-protocol label switching
DWDM: Dense Wavelength Division Multiplexing
TA: Trap Avoidance
ILP: Integer Linear Programming
KSP: K Shortest Paths
IP: Internet Protocol
ATM: Asynchronous Transfer Mode
AP: Active Path
ABW: Active Bandwidth
BBW: Backup Bandwidth
TBW: Total Bandwidth
DPIM: Distributed Partial Information Management
SCI: Sharing with Complete Information Notation For purposes of illustrating and describing the invention, we consider a network G with E directed links (represented by set $\in$) and V nodes. To facilitate our description, we will use a tuple (s→d, w) to represent a new request for connection establishment (or release), where s and d are the source (or ingress) and destination (or egress) of the connection, respectively, and w is the bandwidth (in units) requested by the connection.

The following additional notation will be used:
G: Set of Shared Risk Link Group (SRLG)
$G_a$: This is the union of the SRLG's to which the links along the AP belong.
$A_e$: Set of connections whose APs traverse link e.

$$A_e = \sum_{k \in A_e} w_k:$$

Total (i.e. aggregated) ABW on link e dedicated to the connections in $A_e$.

$B_e$: Set of connections whose BPs traverse link e.

$B_e$: total BBW allocated on line e for $B_e$. Due to BBW sharing, $$B_e \leq \sum_{k \in B_e} w_k$$

$R_e$: Residue bandwidth of link e. Its initial value is equal to the capacity of link e, $C_e$.
$R_e = C_e - A_e - B_e$ (with only protected connections).
$S_g^e$: Total amount of bandwidth required by the set of connections whose APs traverse any link in SRLG g and whose BPs traverse link e.
$BC_g^e$: Additional BBW needed on link e in order to use it as part of a BP for a new connection whose AP traverses link in SRLG g. Its value depends on which BBW estimation method is used.
$BC^e$: Estimated BBW needed on link e along a new BP. Assuming that its corresponding AP and $G_a$ is known $$BC^e = \max_{\forall g \in G_a} BC_g^e.$$

Whether this value is the minimum BBW needed on link e or not depends on which BBW estimation method is used to derive $BC_g^e$.

$BC = [BC^e]_{e \in }^T$: This is a column vector, whose elements are the additional BBW to be allocated on link e.

$P_B(e) = \{S_g^e | g \in G\}$: Profile of BBW on a given link e. This is a vector consisting of a list of $S_g^e$ values, one for each SRLG g. Basically, it specifies the amount of BBW on link e that is used to protect against the failure of every SRLG (e.g., $g_1, g_2 \ldots g_G \in G$) in the network.

$$P_{Be} = \max_{\forall g} S_g^e:$$

This is the maximum value over all the components in $P_B(e)$. It is also the minimum (or necessary) amount of BBW needed on link e to backup all active paths.

$P_A(g) = \{S_g^e | e \in \}$: Profile of ABW on a given SRLG g. This is a vector consisting of a list (or set) of $S_g^e$ values, one for each link e. It complements PB(e), and specifies the amount of ABW on SRLG g that is protected by every link (e.g., $e_1, e_2 \ldots e_E \in $) in the network.

$$P_{Ag} = \max_{\forall e} S_g^e:$$

This is the maximum value over all the components in $P_A(g)$. It is also the sufficient amount of bandwidth that needs be reserved on any link in the network in order to protect against the failure of SRLG g.

$x_1$: This is the edge decision variable column vector for AP. For example $x_{1,e}$ is set to 1 if edge e is used on AP, and 0 otherwise.

$x_2$: This is the edge decision variable column vector for BP. For example, $x_{2,e}$ is set to 1 if edge e is used on BP, and 0 otherwise.

$z_1$: This is the SRLG decision variable column vector for AP. For example, $z_{1,g}$ is set to 1 if any link in SRLG g is used on AP, and 0 otherwise.

$z_2$: This is the SRLG decision variable column vector for BP. For example, $z_{2,g}$ is set to 1 if any link in SRLG g is used on BP, and 0 otherwise.

Prior Solutions

In this section, we first present some definition of Trap and Static and Dynamic Routing. Then, based on these definitions, we describe several existing SRLG-disjoint protection schemes, most of which assume static routing (i.e., without BBW sharing). In addition, we describe how to extend some prior work on shared path protection for the purpose of determining the amount of BBW needed in shared SRLG protection.

DEFINITIONS

We use the following definitions in the detailed description of the invention. We define the following for SRLG protection. If we replace SRLG with link or node, they are also applicable to link or node protection.

Traps: If an algorithm fails to find a pair of SRLG-disjoint paths for a given source and destination node pair, we say that the algorithm falls into a trap. From this definition, traps can be classified into real traps and avoidable traps.

Real Traps: A real trap is connectivity-induced (where connectivity refers to topology and link bandwidth or capacity). In other words, there does not exist any SRLG-disjoint paths between a given source and destination node pair. Thus, a real trap cannot be avoided by any algorithms. For example, in FIGS. 1a and 1b, it is impossible to find a pair of SRLG disjoint paths between node 2 and node 5, because all the optical links incident upon node 5 traverse the same SRLG (i.e., fiber span $g_6$ in the physical layer).

Avoidable Traps: These are traps to a given algorithm but not real traps. Then, avoidable traps to a given algorithm are capable of being avoided by other more elaborate algorithms, e.g., Integer Linear Programming.

Clearly, it is desirable to find an appropriate algorithm that falls into no or only few such avoidable traps.

Usually any min-cost max-flow algorithm (e.g., augmenting path algorithm) can be used to avoid link traps as well as node traps. (The problem of protection against a single node failure can be transformed to that of protection against a single link failure by splitting each node into two halves with a "virtual" directed link in between.) Another extension of the augmenting path algorithm is also proposed to solve the node trap problem. How to effectively avoid (the avoidable) traps for the SRLG protection using heuristics is still an open issue. As described herebelow, only a few heuristics have been proposed, and none of them can significantly eliminate the possibility of falling into an avoidable trap.

Static and Dynamic Routing

In a weighted directed graph (network), a shortest pair of SRLG-disjoint paths from a given source to a given destination node can be determined by an algorithm independently of existing connections only if the algorithm does not consider BBW sharing, and each link has a sufficiently large capacity (bandwidth). This will be referred to as static routing with which any algorithm can satisfy all on-line requests unless it falls into traps (real or avoidable). With static routing, one can compare different algorithms in terms of the number of avoidable traps they fall into, and their running time to process a request by either finding a SRLG-disjoint path pair or giving up after falling into a real or avoidable trap.

On the other hand, when BBW sharing is desired or each link has a limited bandwidth, a shortest SRLG disjoint path pair for a given source and a given destination that any algorithm can find in an on-line fashion will depend on the existing connections. This will be referred to as dynamic routing, with which different algorithms can be compared in terms of bandwidth efficiency for example.

Most of the existing work on SRLG protection, including ILP formulations and heuristics, assume static routing, which in general requires simpler solutions when compared to the case with dynamic routing. For example, the problem of finding a link-disjoint path pair can be solved in polynomial time using any min-cost max-flow algorithms without considering BBW sharing. However, if we want to optimize TBW with BBW sharing, no polynomial time algorithm has been found yet.

Finding SRLG-disjoint path pairs with dynamic routing is even more complex because a link disjoint path pair is a special case of a SRLG disjoint path pair.

SRLG Protection with Static Routing

Static ILP

An ILP formulation was previously proposed in the art for the minimum cost SRLG diverse (disjoint) routing problem. This formulation was called Static ILP. Its objective function is to minimize the summation of the costs of the SRLG-disjoint path pair (without considering BBW sharing) given a weighted graph.

APF-Based Heuristic Algorithms

Generally speaking, in (online) shared path protection, optimizing an AP is much more important than optimizing the corresponding BP because the former will carry traffic almost all the time, and the bandwidth allocated to the latter is used only after AP fails and may be shared by other BPs in the future. Since APF-based heuristics can naturally optimize an AP, and are intuitively simply, many such heuristics have been proposed.

Simple APF

Figure 1B:
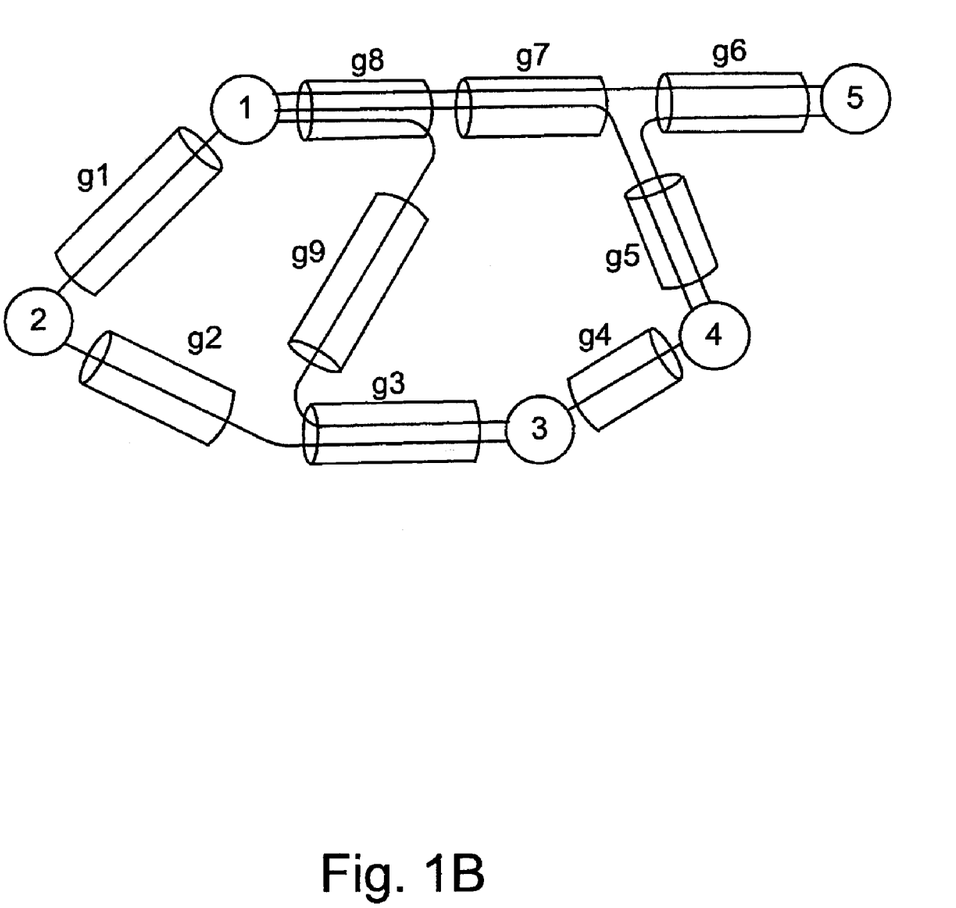
FIG. 1(b) illustrates a physical layer of an optical network.
Figure 2:
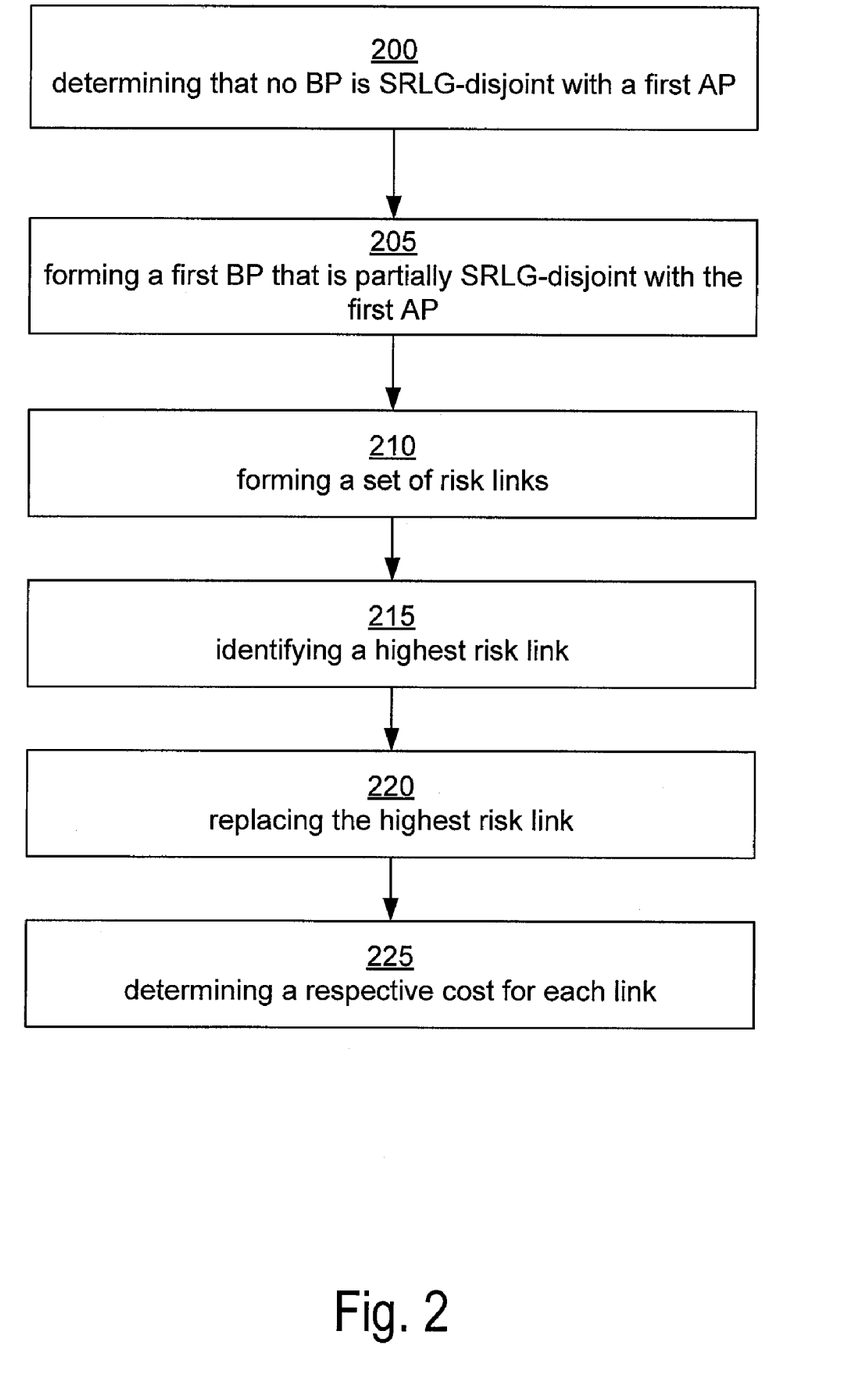
FIGS. 2-8 illustrate exemplary processes incorporating some of the embodiments disclosed herein.
Figure 3:
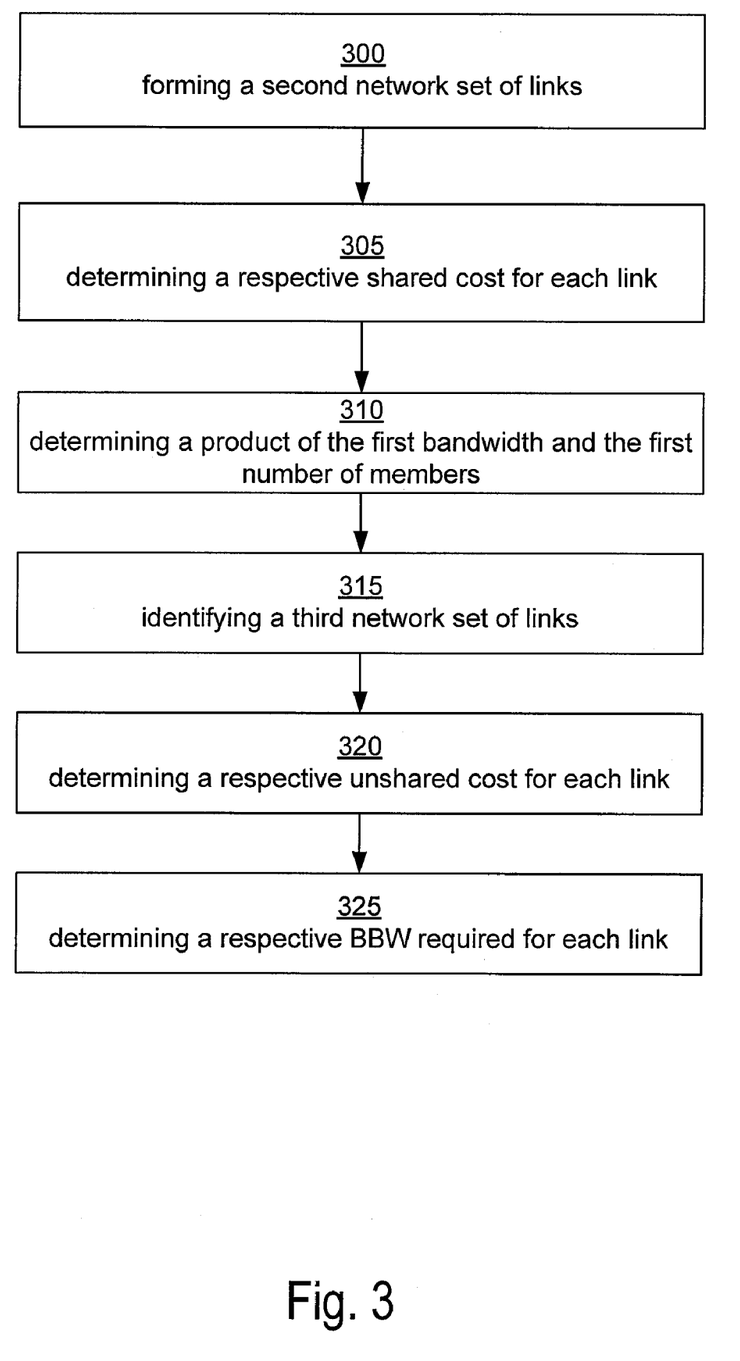
Figure 4:
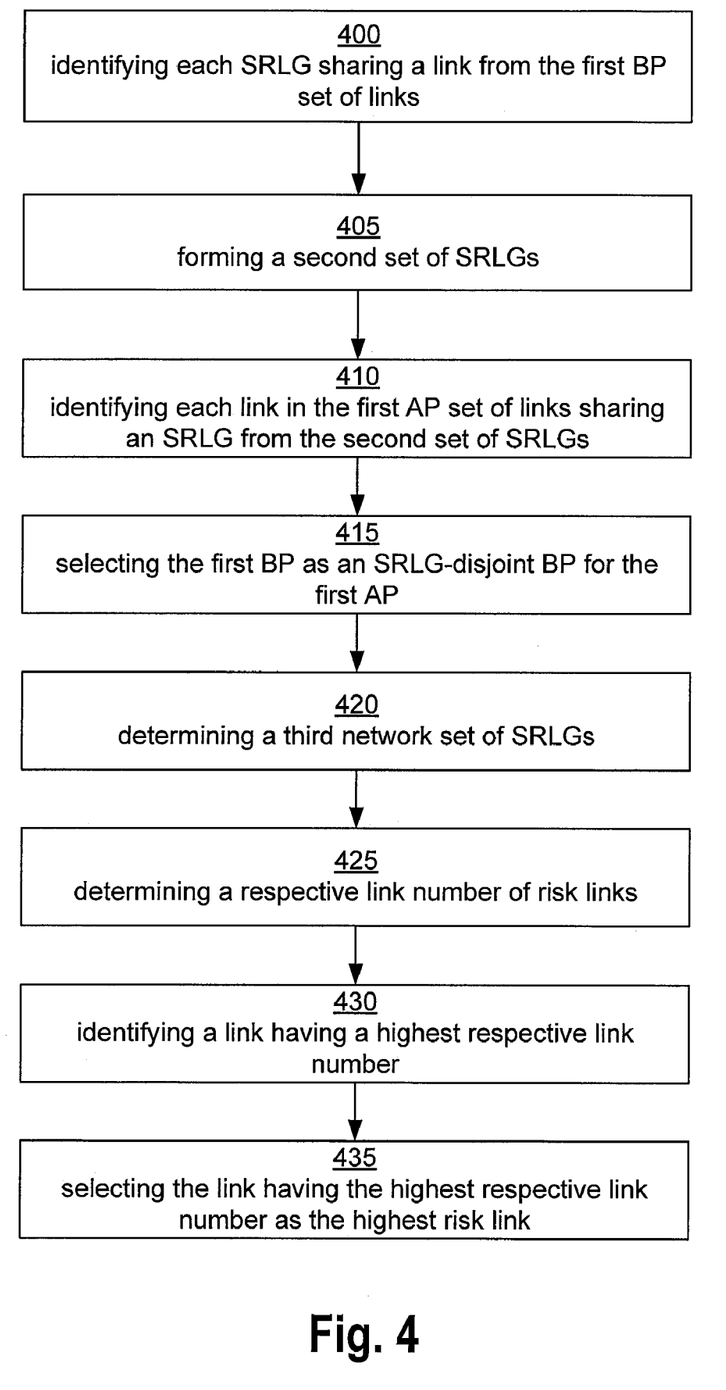
Figure 5:
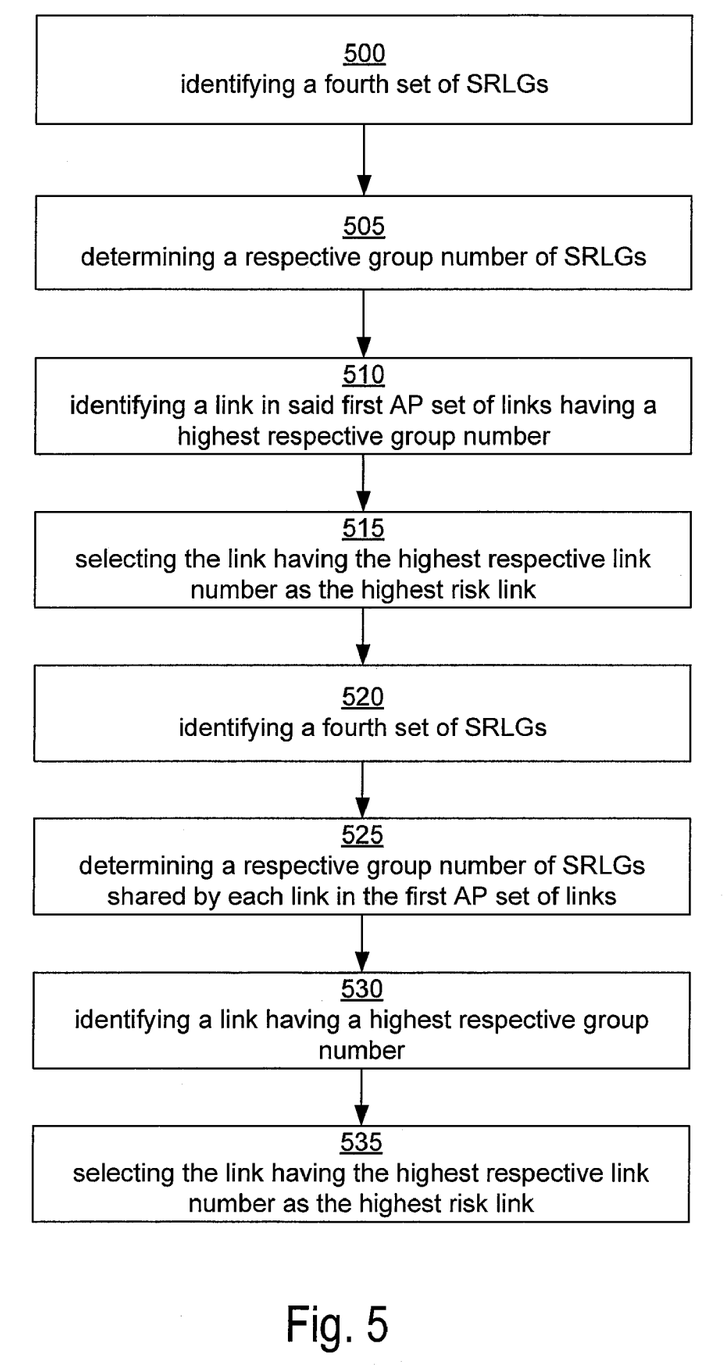
Figure 6:
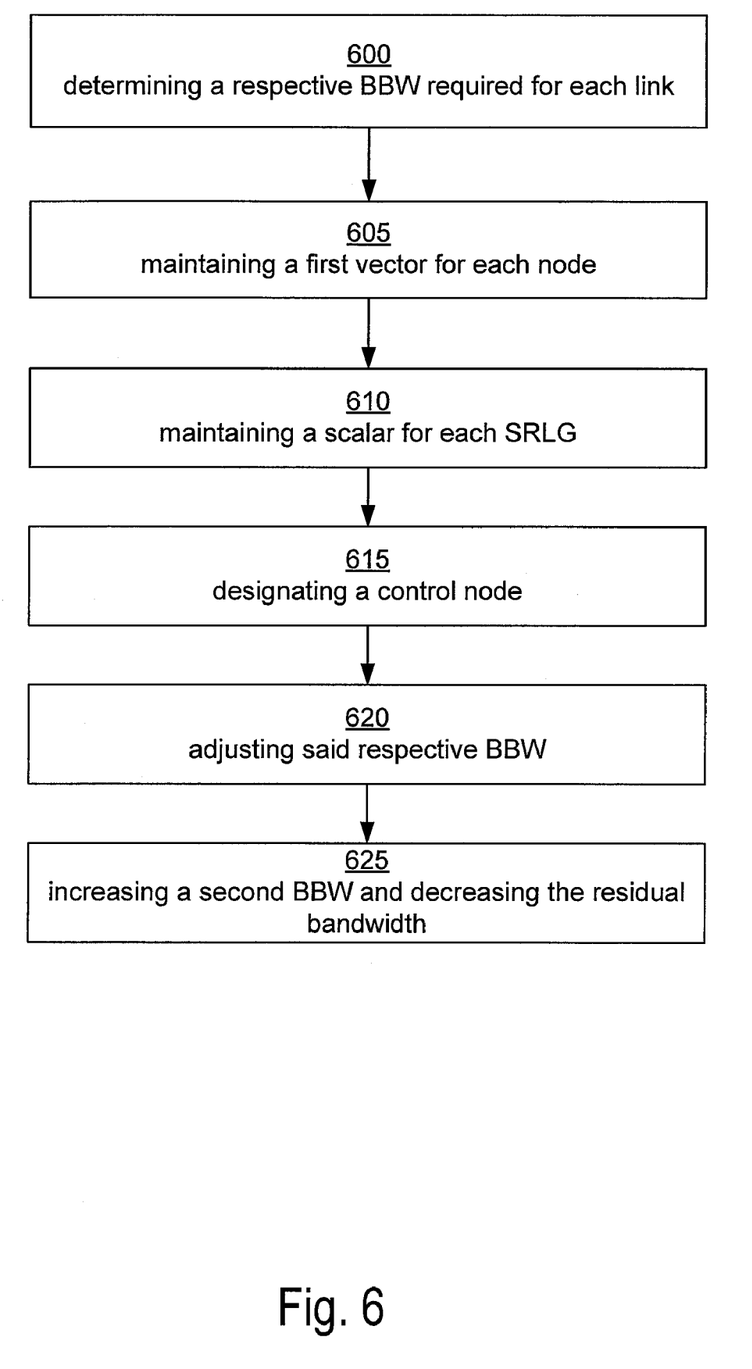
Figure 7:
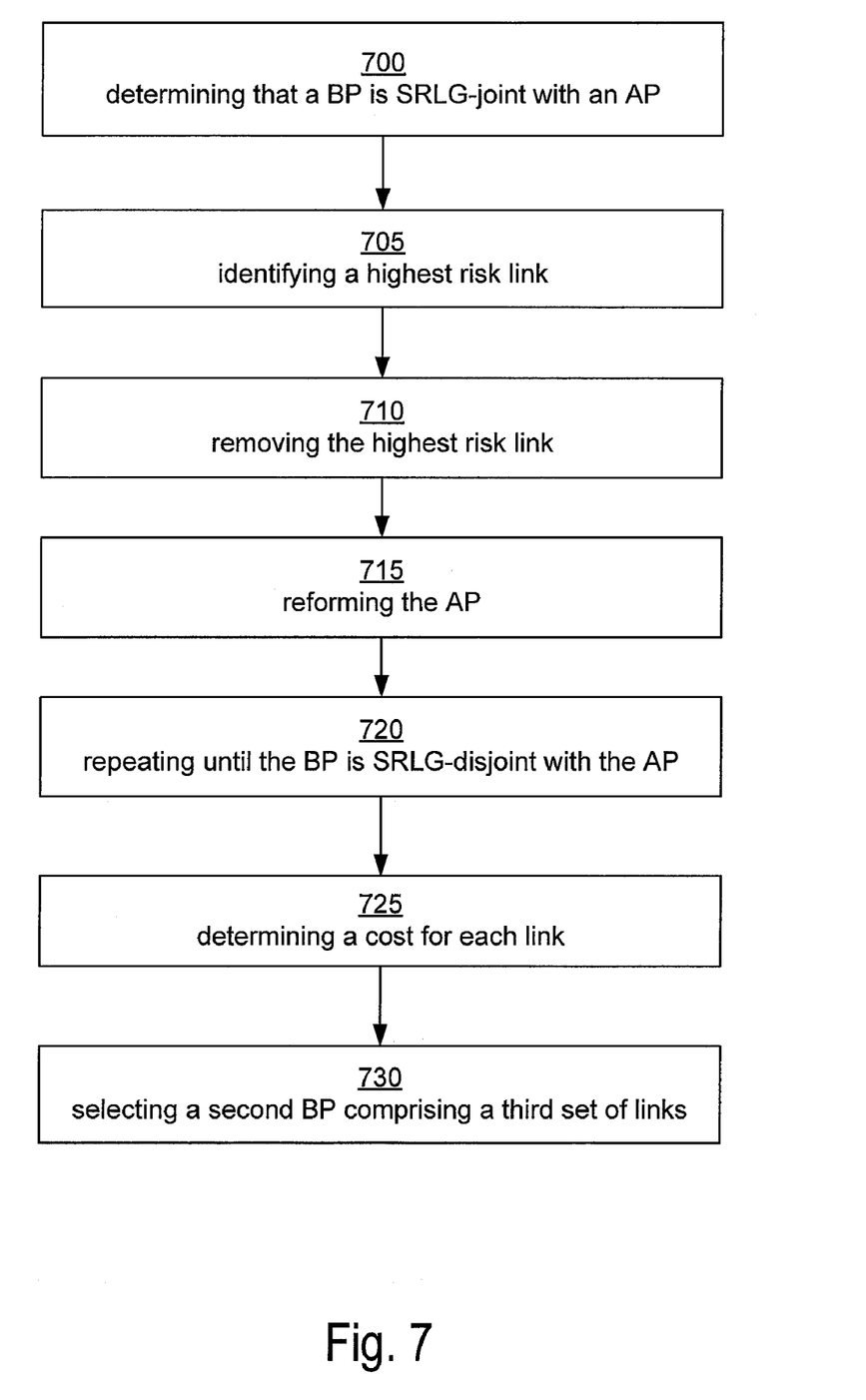
Figure 8:
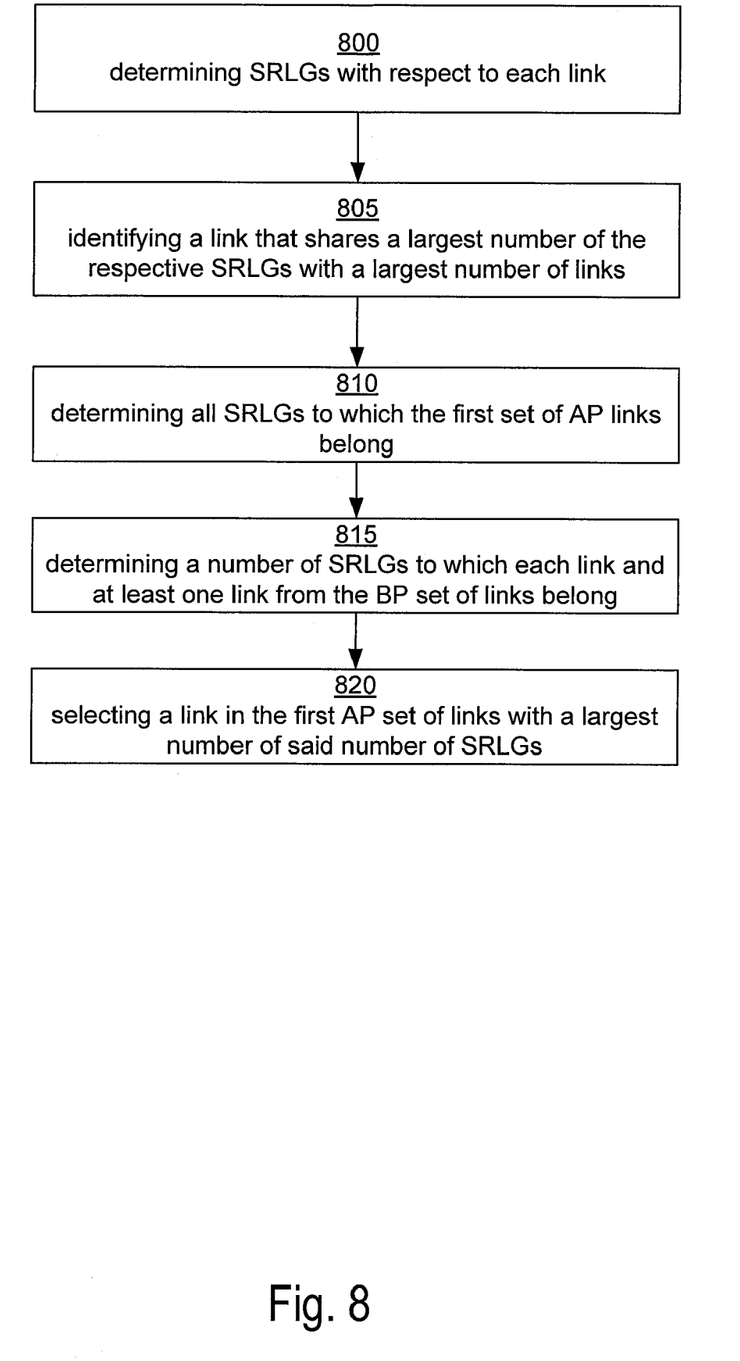

In the so-called Simple APF scheme, for a given source and destination node pair, a shortest path is found first for use as the AP. Afterwards, the algorithm removes (logically) all the links from the network that share for use as the AP. Afterwards, the algorithm removes (logically) all the links from the network that share at least one SRLG with any link in AP, and then try to find another shortest path for use as the corresponding BP. However, the algorithm can easily fall into avoidable traps, especially in large networks. An example is shown in FIGS. 1a and 1b, where a connection from node 1 to node 3 is requested. Simple APF may select link $e_3$ as AP (one hop) first. As a result, link $e_2$ (which shared SRLG $g_3$ with $e_3$), as well as links $e_5$ and $e_6$ (sharing SRLG $g_8$ with $e_3$) need to be removed. Consequently, the algorithm fails to find a SRLG disjoint BP even though there exist two paths consisting of links $e_1$ and $e_2$ and links $e_5$ and $e_4$, respectively, that are indeed SRLG disjoint.

The Bypass Method

To deal with traps, the so-called bypass method was proposed for fiber span failure protection, which is a special case of SRLG failure protection. Its basic idea is to construct a single layer sub-network. However, from our simulation, there is little improvement over Simple APF in reducing the number of avoidable traps.

K Shortest Paths (KSP)

Another natural extension to Simple APF is the K shortest paths scheme, whereby the algorithm finds the first K shortest paths between the source and destination as candidate AP's, and then test them one by one in the increasing order of their costs until a SRLG disjoint BP is found or all of them have been tested. One of the problems of this approach is that after the current candidate AP fails the test, the next candidate AP to be tested is selected solely based on the path length, without considering which link (or links) along the current candidate AP might have prevented the algorithm from finding a SRLG-disjoint BP.

Shared SRLG Protection

Stochastic Approaches

A stochastic approach has been proposed to determine the SRLG-disjoint paths for shared SRLG protection. It is similar to Simple APF with the major difference being in how the cost of each link is assigned before BP is determined using a shortest-path algorithm. More specifically, which Simple APF assigns, say 1 unit (e.g., a channel) to each link that can possibly be used by the BP. This algorithm assigns p<1 units, where p is the probability that BBW sharing can occur on the link. Its main advantage is that it is simple to implement, but at a price, its bandwidth efficiency is not as good as its deterministic counterparts. More importantly, it did not address the trap problem and, in fact, can fall into as many avoidable traps as Simple APF.

Deterministic Approaches

Here, we describe how to estimate/calculate the amount of BBW needed, as well as allocate BBW in shared SRLG protection by extending the techniques used to do the same in some existing shared path protection schemes.

With Complete Information

We start with the case with complete information on the existing connections and link status, in addition to the information on the set of SRLG's denoted by G. More specifically, we assume that for every link e, the total amount of BBW allocated and the residual bandwidth available, denoted by $B_e$ and $R_e$, respectively, are known (the use of $R_e$, will be described in more detail in the next section). Moreover, for every SRLG $g \in G$, $S_g^e$, which denotes the total amount of bandwidth required by the set of connections whose APs traverse any link in SRLG g and whose BPS traverse link e, is also known.

Given the above complete (aggregate) information, we can calculate the additional amount of BBW needed to satisfy a new connection requiring w units of bandwidth as follows. Assume that the new AP uses at least one link belonging to SRLG g. Then, the minimum BBW needed on link e if link e is used by the new BP, is $$BC_g^e = \max\{S_g^e + w - B_e, 0\} \quad \text{(equation 1)}$$

Accordingly, given the new AP, and $G_a$, which is the union of the SRLG's to which the links along the AP belong, the cost that will be assigned to link e is $$BC^e = \max_{\forall g \in G_a} BC_g^e \quad \text{(equation 2)}$$

Note that, this cost is also the necessary and sufficient amount of BBW that needs to be (and will be) allocated on link e if link e is used by the new BP. Also, the amount of information that needs to be maintained by a controller is $O(|\in| \cdot |G|)$, where $\in$ is the set of links, and the above technique is an extension to existing shared path protection schemes assuming complete information but without considering SRLGs.

With Partial Information

A distributed shared SRLG protection scheme (without considering trap avoidance) requiring only partial information has been proposed. In the following, the notations consistent with those used above, which described a similar distributed shared path protection scheme with partial information, will be adopted.

With partial information (and distributed control), a major difference is that each node n now needs to maintain, in addition to $B_e$ and $R_e$, a vector for each link e local to (i.e. incident upon) node n. This vector is defined as $P_B(e) = \{S_g^e | g \in G\}$, where G is the set of all SRLGs, which represents the profile of BBW allocation on link e.

Moreover, each edge node needs to maintain a scalar $$P_{Ag} = \max_{\forall e} S_g^e$$

for every SRLG $g \in G$ (in addition to $B_e$ and $R_e$, for every link e). Finally, for each SRLGg, a node can be designated as the control node to maintain the profile of Active Bandwidth (ABW) allocation for the SRLG g, which is defined to be $P_A(g) = \{S_g^e | e \in \in\}$. Accordingly, the amount of local and remote information that needs be maintained at any given node is limited to $O(|\in|+|G|)$.

As a tradeoff, for a given new AP, the minimum BBW needed on link e if link e is used by the new BP can only be (overly) estimated as $$BC_g^e = \max\{\min(P_{Ag}+w-B_e,w),0\} \quad \text{(equation 3)}$$

Based on which, the cost to be assigned to each link that can possibly be used by the new BP can also be given by Equation 2 above. This may be more than the necessary amount needed. However, once the new BP is determined using some path determination algorithms to be described below based on this overly-estimated cost, minimum amount of BBW can still allocated along the chosen BP by extending the signaling protocols. More specifically, once the two SRLG disjoint paths, AP and BP, are determined, the ingress node will send a signaling packet to the nodes along the BP. At each node along the BP, $P_{Be}$ is recomputed as $$\max_{\forall g} S_g^e$$

for link $e \in BP$. Thereafter, the amount of BBW to be allocated on link e is bw=$P_{Be} - B_e \geq 0$. If bw>0, then $B_e$ and $R_e$ are increased and reduced by bw, respectively. In addition, the ingress node will also send one "notification" packet containing the information on BP to the designated control node for each SRLG g∈$G_a$, which can then update its ABW profiles, and recomputed $P_{Ag}$. The new $R_e$, $B_e$ and $P_{Ag}$ will then be broadcast to all the edge nodes using some information exchange protocols.

Why the Prior Art Methods are Inefficient

For SRLG protection with static Routing, the BBW sharing wasn't being considered, so the bandwidth efficiency of those schemes is very low. Although static ILP formulation can be used to solve the minimum cost SRLG disjoint routing problem, how to extend these Static ILP formulations to the case with dynamic routing and the performance of such an extended ILP performance has not been discussed. APF-based heuristic algorithms optimize the selection of the active path according to least cost/minimum hop or a similar metric, which may easily fall into avoidable traps. Bypass and KSP methods can reduce the number of avoidable traps a little more than Simple APF, but they don't consider avoiding the use of the most "risky" trap link(s) when selecting a new candidate AP for testing the existence of a SRLG-disjoint BP. So these algorithms are not very efficiency and speedy in trap avoidance.

Stochastic and Deterministic approaches are similar to the simple APF. That means they may fall into as many avoidable traps as Simple APF. In addition, due to using less information, the efficiency of resource usage in stochastic algorithms is worse than the deterministic approach.

How the Present Invention Works

The present invention avoids "traps" in path determination and maximizes bandwidth sharing. For the first time, an innovative heuristic approach is proposed to avoid traps which are much more common in networks when considering SRLG (for example, a simple heuristic may run into traps 30% of the time). The proposed algorithm can effectively avoid almost all the traps as an ideal algorithm (e.g., based on Integer Linear Programming or ILP) and yet can run much faster and thus is feasible for large SRLG networks. Also for the first time, an efficient shared SRLG protection scheme that utilizes the proposed trap avoidance heuristic is proposed. This scheme, though, uses a fast (polynomial time) algorithm, and can achieve a bandwidth efficiency that is nearly as high as and sometimes even better than ILP-based schemes (which could be infeasible for large networks).

We developed a Trap Avoidance (TA) algorithm and method implementing the algorithm. This algorithm is designed mainly for shared SRLG protection with dynamic routing, although it is also applicable for static routing. It is similar to KSP in that it will iteratively test candidate APs in order to find one that has a SRLG disjoint BP. However, TA uses a more intelligent method to avoid the most "risky" trap link when selecting a new candidate AP for testing the existence of a SRLG-disjoint BP.

The TA algorithm significantly outperforms any existing heuristics in terms of avoiding traps and the running time of the algorithm. In order to verify that it is also near-optimal in terms of bandwidth efficiency when used in dynamic routing, we developed several ILP formulations for shared SRLG protection with dynamic routing for performance comparison with TA.

Trap Avoidance Algorithm

Find a Candidate BP

In TA, once a candidate AP is found, and if there is no SRLG-disjoint BPs for it, TA will still find a BP that uses as few links sharing a common SRLG with the candidate AP as possible in order to utilize the information on the BP to select the next candidate AP.

More specifically, given a candidate AP, TA will first assign all the directed links along AP a cost of infinity to prevent them from being used by BP. It will then assign all the remaining links that do not share any SRLG with any of the links on AP a cost as follows: for static routing, a cost of 1 hop (or channel), or w units, where w is amount of bandwidth requested by the connection, can be assigned to every such a link; for dynamic routing in networks whose links can have a sufficiently large capacity but BBW sharing is desired, such a link e will be assigned a cost of $BC^e$ based on the discussions in the previous section on deterministic approaches for shared SRLG protection (with either complete or partial information). For dynamic routing in networks whose links have a limited bandwidth, the only difference is that if such a link e has a residual bandwidth less than the requested amount w (when no BBW sharing is considered) or less than $BC^e$ (when BBW sharing is considered), the cost assigned to it will be infinity instead.

In TA, all the remaining links that share at least one SRLG with any link on AP (including the links along the reversed AP) will be assigned a large value M≧·w·E as their costs. This is to discourage any shortest-path algorithm to use such links for the candidate BP. If none of these links having cost M is used by the candidate BP, TA terminates with an SRLG-disjoint AP and BP pair. Otherwise, the given candidate AP does not have any SRLG disjoint BP. In other words, at least one of the links along the candidate AP should be excluded, and hence, a new candidate AP needs to be found (and tested for existence of a SRLG-disjoint BP). This is in contrast to existing heuristics that assign these links a cost of infinity to prevent them from being used by BP, and do not utilize the information on the current AP and BP candidates to guide the selection of the next candidate AP in an intelligent way. If there is no SRLG-disjoint BP for a given candidate AP, a partially SRLG-disjoint BP can be found instead. That is, to minimize the length of a BP, TA finds a BP using a minimal amount of links having an M-cost or will find a BP with a smallest total M-cost associated with the links in the BP.

Find a Candidate AP

We now describe how to find a new candidate AP after determining that the current AP does not have a SRLG-disjoint BP.

Let ShortestPath (A) be a function that outputs a shortest path between a given source and destination node pair in a weighted directed network whose set of nodes is given and the set of links that can be used by the candidate AP is A. Initially, set A includes all |∈| links in the network, but after a candidate AP is ruled out, set A is reduced by removing the most "risky" link along the AP from it.

More specifically, let T be the non-empty set of links along the current candidate BP, which share a SRLG with at least one link along the current candidate AP (and have the cost of M). Denote by MostRiskyActiveLink (AP, T) a function that outputs the most "risky" link along the AP to be removed from A. One way to implement this function is to select the link in AP that shared one or more SRLG's with the largest number of links in T. Since many links in T may share the same SRLG, another way to implement MostRiskyActiveLink (AP, T) is to first define "Conflictive SRLG Set" to be the union of the SRLG's to which the links in T belong, and then select the link in AP that belongs to the largest number of SRLG's within the "Conflictive SRLG Set". The latter method is more intuitive if reducible SRLGs are excluded beforehand.

Once the most risky link is removed, the algorithm continues by trying to find a new candidate AP based on A, and an SRLG-disjoint BP for the candidate AP based on the original set of ∈ links with each link assigned an backup cost as discussed previously. The algorithm terminates when it finds an SRLG disjoint AP/BP pair or fails to find a new candidate AP or candidate BP during the iteration. In the worst case, the algorithm needs |∈| iterations. However, as to be shown, the average and maximal number of iterations needed are much smaller in practice.

The pseudocode for the TA algorithm is shown below, where FindCandidateBP(∈, AP) denotes a function that returns a BP, if it exists, which may or may not be SRLG-disjoint with the given AP, using the method described above.

```
Found ← false
Iteration ← 0
A ← ∈
while A ≠ ∅ do
    Iteration ← Iteration +1
    AP ←Shortest Path (A)
    if AP = ∅ then
        break;
    end if
    BP← FindCandidateBackup(∈, AP)
    if BP = ∅ then
        break;
    end if
    T ← {e|Cost_e = M, e ∈ BP}
    if T = ∅ then
        Found ← true
        return AP and BP;
    end if
    R←Most Risky Active Link (AP, T)
    A ← A - {R}
end while
```

As an example of how TA works, consider FIGS. 1a and 1b again. Upon receiving a request for a connection from node 1 to node 3, TA will, just as Simple APF, select link $e_3$ as the first candidate AP. As the result, the backup cost of links $e_2$, $e_5$, and $e_6$ are assigned as M since they share at least one SRLG with link $e_3$. Consequently, TA selects links $e_1$ and $e_2$ as BP, and T consists of link $e_2$ while the "Conflictive SRLG Set" consists of SRLG $g_3$. Hence, link $e_3$ will be selected as the most "risky" link to be removed from any future AP candidates. Thereafter, TA selects link $e_1$ and $e_2$ as the second candidate AP, for which it can find a SRLG disjoint BP consisting of links $e_5$ and $e_4$.

ILP Routing for Online SRLG Protection

Best-Sharing ILP for SRLG Network

With either complete or partial information, respectively, the problem of minimizing TBW needed to satisfy a new connection request with BBW sharing but without considering SRLG has been formulated using ILP in SCI and in DPIM, respectively. On the other hand, Statis ILP is a formulation to solve a similar problem that considers SRLG but no BBW sharing as discussed previously. In this section, we combine the two types of ILP formulations when developing a new ILP, called Best-Sharing ILP, which considers both SRLG and BBW sharing.

The new objective function is $$\min w \cdot x_1 + BC$$

where $x_1$ is the edge decision variable column vector for AP (for example, $x_{1,e}$ is set to 1 if edge e is used on AP, and 0 otherwise;) and $BC = [BC^e]_{e \in \epsilon}^T$ is the column vector, whose elements are the additional BBW to be allocated on link e.

Similarly to $x_1$, let $x_2$ be the edge decision variable column vector for BP. In addition, let $z_i$ (i=1,2) be the SRLG decision variable column vectors for AP and BP respectively. For example, $z_{1,g}$ is set to 1 if any link in SRLG g is used on AP, and 0 otherwise.

Besides the constraints listed in the Static ILP, we need the following additional constraints.

$$x_{1,e} = 0 \text{ if } R_e < w \quad \text{(equation 4)}$$

$$BC^e \geq BC_g^e \cdot (z_{1,g} + x_{2,e} - 1), \forall e \notin G_g \quad \text{(equation 5)}$$

$$0 \leq BC^e \leq \min(w, R_e) \quad \text{(equation 6)}$$

Constraint (equation 4) guarantees that the edges without enough residual bandwidth will not be selected in AP.

Constraint (equation 5) gives a lower bound on the additional BBW required on link e if one or more links in SRLG g and link e are used by AP and BP respectively.

No-Sharing ILP for SRLG Network

For comparison purposes, we have also implemented No-Sharing ILP for SRLG Network, which is essentially a modified Static ILP for use in a network with limited link capacity. More specifically, No-Sharing ILP will first remove all the links with residual bandwidth less than w, (the requested bandwidth), and then find a shortest SRLG-disjoint path pair in the same way as static ILP. The shorter of the two can be used as the AP and the other as the BP. Thereafter, we will allocate w units of bandwidth on every link along the AP and BP.

General-Sharing ILP for SRLG Network

Since Best-Sharing ILP is time-consuming, and No-Sharing ILP is bandwidth inefficient, we develop a compromising scheme called General-Sharing ILP. It uses the same path determination method as No-Sharing ILP does (that is, it does not consider BBW sharing at this time). However, once the AP and BP are chosen, minimal BBW ($\leq w$) will be allocated on each link along the BP as described previously, whether complete or partial information is available. In fact, since No-Sharing ILP determines the same path pair with whether complete or partial information is available, General-Sharing ILP (as well as No-Sharing ILP) performs the same in either case (but the Best-Sharing ILP does not).

Performance Evaluation with Static Routing

We have compared the performance of various schemes for both static and dynamic routing using three sample networks, whose important parameters are listed in Table 1. Network 1 is a typical carrier-like transport backbone network, and Network 2 and 3 are same as those used and described in "Diverse routing in mesh optical networks" (J. Q. Hu, Submission, http://people.bu.edu/hqiang/papers/srlg.pdf.2002), which is incorporated herein by reference. For each network, we first use CPLEX 7.1 to solve the Static ILP formulation to find a pair of SRLG-disjoint paths among all possible node pairs, and determine the number of real traps, which is equal to the number of node pairs for which a SRLG-disjoint path pair does not exist. The table lists the Real Trap Ratio which is the number of real traps found over N(N−1), where N is the number of nodes in the network.

TABLE 1

Toplogies Used in Simulation

| Parameter | Net. 1 | Net. 2 | Net. 3 |
| --- | --- | --- | --- |
| Nodes | 119 | 47 | 144 |
| Bi-directed Edges | 190 | 97 | 298 |
| Number of SRLGs | 388 | 65 | 198 |
| Real Trap Ratio | 6.78% | 4.44% | 0.07% |

Note that, if one SRLG is a subset of another SRLG (when treating each SRLG as a set of links), the former is considered as a reducible SRLG. In our simulation, we exclude such reducible SRLG's using an off-line algorithm.

As mentioned earlier, with static routing, the performance metrics include an algorithm's running time and its trap avoidance ratio, which is the total number of avoidable traps the algorithm falls into when trying to establish an SRLG disjoint path pair for all the node pairs over $N(N-1)$.

Number of Iterations in TA

The average and maximal iterations needed by the TA algorithm refer to the number of candidate APs it has to test in order to either find an SRLG-disjoint path pair for a given node pair, or declare that it cannot avoid the trap (most likely because it is a real trap). The results are listed in Table 2.

TABLE 2

Iteration number of TA Algorithm with Static Routing

| Iteration Number | Net. 1 | Net. 2 | Net. 3 |
|---|---|---|---|
| Average Iteration | 1.46 | 1.12 | 1.52 |
| Max Iteration | 12 | 8 | 9 |

As can be seen, the difference between the average and the maximum is quite large because most of the time, TA can find a SRLG-disjoint path pair for a given node pair within a couple of iteration as long as there is no real trap between the node pair. In the case there is a real trap, TA may have to test About 10 candidate APs before no other candidate AP or BP can be found.

Avoidable Trap Ratio for APF-Based Heuristic Algorithms

The avoidable trap ratios for all APF-based heuristic algorithms discussed in this paper are listed in Table 3. We apply the new implementation of Yen's ranking loopless paths algorithm to output the K shortest paths. Three different K values have been tested in this experiment, namely 10, 40, and the maximal number of iterations needed by TA (shown in Table 2) for the same network.

From Table 3, we can see that Simple APF method will fall into avoidable traps frequently, especially in large networks. We also find that the Bypass method obtains little improvement over Simple APF. Compared with KSP, TA algorithm achieves a better (lower) avoidable trap ratio (which in fact is 0% for all three with KSP, TA algorithm achieves a better (lower) avoidable trap ratio (which in fact is 0% for all three networks) and requires that a fewer candidate APs be tested (see Table 2 for the difference in the average number of iterations TA needs, and the maximum, the latter also being the number of candidate APs the KSP algorithm uses). In other words, TA can run much faster than KSP does, which is also shown below.

TABLE 3

Avoidable Trap Ratio

| Algorithm | Net. 1 | Net. 2 | Net. 3 |
|---|---|---|---|
| Simple APF | 20.91% | 8.05% | 30.98% |
| Bypass Method | 19.90% | 7.40% | 30.78% |
| KSP, K = 10 | 2.36% | 0.19% | 4.56% |
| KSP, K = 40 | 0.44% | 0.00% | 0.51% |
| KSP, K = Max Iteration | 1.97% | 0.74% | 5.08% |
| TA algorithm | 0.00% | 0.00% | 0.00% |

Average Running Time

We list the average running time on a Pentium IV 1.7 GHz PC for Static ILP, KSP and TA to either find a pair of SRLG-disjoint paths for a node pair in Network 2, or to declare that it cannot avoid the trap. For KSP, K shortest paths will be computed before any BPs are considered. The running time of KSP reported in the table is for the case where K is 40. Note that, the running time of KSP does not change significantly when K is from to 2 to 40 due to the fact that the initialization time is dominant. But for a larger K, the computation complexity of the KSP algorithm is $O(K|V|(|E|+|V|\log|V|))$, which increases with K. Note that, at K=4, KSP will not fall into any avoidable traps, just as Static ILP and TA. All other heuristics algorithms discussed earlier will and hence are not considered in this study to make the comparison as fair as possible. From this table, it is clear that the proposed TA algorithm has a superior running time performance over KSP and Static ILP.

TABLE 4

Average Running Time for One Path Pair Determination

| KSP | Static ILP | TA Algorithm |
|---|---|---|
| 95 ms | 174 ms | 2 ms |

Performance Evaluation with Dynamic Routing

In this section, we evaluate the performance of TA in terms of bandwidth efficiency and earning ratio (to be defined later) in Network 1. In order to verify that TA can indeed achieve near-optimal results, we also compare its performance with that of several ILP formulations for the case with dynamic routing. Here, we ignore the connection requests from the node pairs with a real trap between them, as such a request cannot be satisfied by any algorithm. Since other heuristics, including KSP, have a non-zero avoidable trap ratio with dynamic routing, they are excluded from this part of the performance study to make the comparison as fair as possible.

Traffic Types

We consider two types of traffic in an on-line setting: the incremental traffic in which an established connection lasts sufficiently long, and the fluctuating traffic in which it may terminate after a certain duration before a new connection request arrives.

In both cases, the ingress and egress of a connection establishment request are assumed to be evenly distributed among all nodes. For the case with incremental traffic, the bandwidth required by the connections is assumed to be uniformly distributed between 1 and 10 units with an arbitrary request arrival process. (The latter does not affect the performance as each connection virtually lasts forever).

For the case with fluctuating traffic, the bandwidth required varies from 1, 2, 3, 4, 6 and 12 units with probability of 20%, 10%, 30%, 10%, 10%, 20%, respectively. In addition, requests are assumed to arrive according to Poisson process, and the connection duration has a Pareto distribution. This is just an attempt to model realistic traffic (which may be self-similar and whose bandwidth requirements rang from OC-1 to OC-12).

While the results may differ with different assumptions on the bandwidth requirement and request arrival process, and vary from one network to another, we have found that the relative performance of the schemes do not change as a result.

Performance Metrics

Two performance metrics are used: bandwidth saving ratio for incremental traffic and earning fulfillment ratio for fluctuating traffic.

Bandwidth Savings Ratio

To obtain this metric, it is assumed that the capacity of each link is sufficiently large (and hence all requests will be satisfied), and the traffic is incremental. After an appreciable number of requests have been satisfied, TBW consumed by all the requests using each of the schemes is evaluated. We define the bandwidth saving ratio BSR (due to BBW sharing) achieved by a scheme to be the TBW consumed by using this scheme over the TBW consumed by using the No Sharing ILP scheme (which provides a baseline performance). Hence, the BSR of the No-Sharing ILP is zero, and the larger the BSR an algorithm can achieve, the better the algorithm is. Even if an ideal scheme that achieves maximum BBW sharing is used, its BSR will be upper-bounded by 50% (achievable only if no BBW is needed at all).

Earning Fulfillment Ratio

The bandwidth saving measure may not mean such since in a practical case, all links have a finite capacity and thus not all requests can be satisfied.

Accordingly, in this set of experiments (simulation), we assume that each link has a finite capacity and fluctuating traffic is considered. Each link (consisting of two unidirectional links) is assumed to have a capacity of 48 units in each direction (to model an OC-48 link). As a result, some requests will be rejected under a heavy traffic load.

Note that comparing different schemes based on the request blocking probability may not be fair as blocking a connection between New York and New Jersey is different from blocking a connection from New York to California.

This motivates us to use the total earning (or revenue) as a metric based on a scheme-independent Earning Rate matrix whose entry at (i,j) represents the earnings per bandwidth unit and time unit by satisfying a connection from ingress node i to egress node j. The earnings by satisfying a connection from i to j is thus the product of the earning rate, requested units of bandwidth, and the connection duration. In this study, for lack of a better alternative, the earning rate is based on the cost of using the cheapest (or shortest) SRLG-disjoint pair of AP and BP from i to j which can be found with static routing, and hence is independent of the current load in the network.

For a sequence of connection requests, define Maximal Possible Earning to be the sum of the earnings by satisfying all the requests, which is thus independent of the order of requests' arrival. We compare the Earning Fulfillment Ratio (EFR) of each scheme, which is the Total Earnings obtained by each scheme over the Maximal Possible Earning. If a scheme can satisfy all the requests, its EFR is 100%.

Simulation Results

Incremental Traffic

Table 5 shows the Bandwidth Saving Ratio (vs. No Sharing ILP) after satisfying 500 connection establishment requests (or demands) in Network 1.

TABLE 5

| Bandwidth saving Ratio | | |
|---|---|---|
| Amount of Information | SCI | DPIM |
| General-Sharing ILP | 14.40% | |
| Best-Sharing ILP | 28.10% | 18.70% |
| TA Algorithm | 25.00% | 19.80% |

Note that, though not shown, the running time of General-Sharing ILP for each request is about the same as the Static ILP, and the running time of TA with dynamic routing is also about the same as with static routing (see Table IV). This means that TA can run much faster than General Sharing and yet achieve much better BSR. Also, while Best-Sharing has a slightly better BSR than TA with complete information, its running time is much larger. For example, it takes on average more than 60s for one request in Network 1 (compared to merely 2 ms for TA). In addition, note that TA performs better than Best-Sharing ILP with partial information in this simulation. This result, though surprisingly pleasant, is reasonable as the Best-Sharing ILP only optimizes for each request (based on partial information) as it comes without knowing what request may come in the future, not being able to optimize for all the requests that have already been satisfied.

Fluctuating Traffic

Table 6 shows the Earning Fulfillment Ratio after processing 500 requests (not all of them are satisfied) in Network 1.

TABLE 6

| Earning Fulfillment Ratio | | |
|---|---|---|
| Amount of Information | SCI | DPIM |
| General-Sharing ILP | 72.90% | |
| Best-Sharing ILP | 89.30% | 75.90% |
| TA Algorithm | 88.40% | 82.10% |

The results in this table are similar to those in the previous, and hence similar observations can be made. From these results, it is clear that the proposed TA algorithm is indeed a more attractive algorithm than any existing algorithms, and perhaps the best that any heuristic algorithms can ever be.

Thus, it is seen that the objects of the invention are efficiently obtained. The present invention achieves bandwidth efficiency and, at the same time, efficient trap avoidance using scalable algorithms, a real challenge in providing shared SRLG protection, whereas all prior methods settle for some kind of trade-offs. Although a preferred embodiment of the invention has been described, it should be apparent that modifications and changes to the invention may be readily imagined by those having ordinary skill in the art, and these changes and modifications are intended to be within the scope of the claims.

What we claim is:

1. A method comprising:
   determining that no backup path (BP) is shared risk link group (SRLG)-disjoint with a first active path (AP), the first AP having a first set of links and connecting first and second nodes in an optical network;
   forming a first BP connecting the first and second nodes in the optical network, wherein the first BP is partially (SRLG)-disjoint with the first AP;
   forming a set of risk links selected from said first set of links;
   identifying a highest risk link among the set of risk links; and
   replacing the highest risk link with a link from the optical network to form a second AP connecting the first and second nodes in the optical network.

2. The method of claim 1 wherein a first network set of links forms said optical network; further comprising:
   determining respective costs for the links in said first network set of links, wherein said respective costs are with respect to said first AP.

3. The method of claim 2 wherein determining the respective costs for the links in said first network set of links further comprises determining respective AP costs for the links in said first set of links.

4. The method of claim 3, wherein said respective AP costs are assigned a value of infinity.

5. The method of claim 3, wherein said network further comprises a first set of SRLGs formed from the SRLGs in said network sharing a link from said first AP set of links; said method further comprising:
forming a second network set of links, wherein the links in said second network set of links share an SRLG in said first set of SRLGs; and,
wherein determining the respective costs for each link in said first network set of links further comprises determining respective shared costs for the links in said second network set of links.

6. The method of claim 5, wherein said first AP is characterized by a first bandwidth and said first network set of links comprises a first number of members; and,
wherein determining a respective shared cost further comprises determining a product of said first bandwidth and said first number of members.

7. The method of claim 3 further comprising:
identifying a third network set of links, wherein the links in said third network set of links is separate from the SRLGs in said first network set of SRLGs; and,
wherein determining the respective costs for the links in said first network set of links further comprises determining respective unshared costs for the links in said third network set of links.

8. The method of claim 7 wherein said first optical network is routed statically and said first AP is characterized by a second bandwidth; and,
wherein determining the respective unshared costs for the links in said third network set of links further comprises using said second bandwidth as the respective unshared costs.

9. The method of claim 8 wherein said optical network is routed dynamically; and, said method further comprising: determining respective backup bandwidths (BBWs) associated with the links in said first network set of links.

10. The method of claim 9 wherein the links in said first network set of links comprises residual bandwidths at least equal to the respective BBWs; and, wherein determining the respective unshared costs for the links in said third network set of links further comprises using the respective BBWs as the respective unshared costs.

11. The method of claim 9 wherein said first AP has a third bandwidth; and,
wherein determining the respective unshared costs for the links in said third network set of links further comprises using costs equal to infinity for the links in said third network set of links having a bandwidth less than said third bandwidth.

12. The method of claim 9 wherein the links in said third network set of links are associated with respective residual bandwidths; and,
wherein determining the respective unshared costs for the links in said third network set of links further comprises assigning costs equal to infinity for the links in said third network set of links comprising respective residual bandwidths less than the respective BBWs.

13. The method of claim 5 wherein the first BP comprises a first BP set of links; and, said method further comprising:
identifying at least one SRLG in said first set of SRLGs sharing a link from said first BP set of links;
forming a second set of SRLGs comprising at least one identified SRLG from said first set of SRLGs; and,
identifying at least one link in said first AP set of links sharing an SRLG from said second set of SRLGs; and,
wherein forming the set of risk links selected from said first AP set of links further comprises including the identified links in said first AP set of links in said set of risk links.

14. The method of claim 13 wherein said set of risk links is empty; and, said method further comprising: selecting said first BP as an SRLG-disjoint BP for said first AP.

15. The method of claim 13, further comprising:
determining a third network set of SRLGs, where the SRLGs in said third network set of SRLGs is shared by a link from said first AP set of links and a link from said set of risk links;
for the links in said first AP set of links, determining a respective link number of said risk links with which the links in said first AP set of links share an SRLG from said second network set of SRLGs; and,
identifying a link in said first AP set of links having a highest respective link number; and,
wherein selecting the highest risk link further comprises selecting said link in said first AP set of links having said highest respective link number as said highest risk link.

16. The method of claim 13, further comprising:
identifying a fourth set of SRLGs, where the SRLGs in said fourth set of SRLGs share a link from said set of risk links;
determining a respective group number of SRLGs in said fourth set of SRLGs shared by the links in said first AP set of links;
identifying a link in said first AP set of links having a highest respective group number; and
wherein selecting the highest risk link further comprises selecting said link in said first AP set of links having said highest respective group number as said highest risk link.

17. The method of claim 16 wherein said optical network further comprises a first plurality of nodes, a first plurality of edge nodes, and a fifth network set of SRLGs including every SRLG in said optical network; and,
wherein determining a respective BBW required for the links in said first network set of links further comprises:
maintaining a first vector for at least one node in said plurality of nodes, wherein said first vector is for links in said first network set of links incident upon said at least one node;
the edge nodes in said plurality of edge nodes maintaining respective scalars for the SRLGs in said fifth set of SRLGs; and,
designating a control node from said plurality of nodes for a link in said first AP set of links, wherein said control node maintains a profile of active bandwidth allocation for said link in said first AP set of links.

18. The method of claim 17 wherein said first vector specifies a profile of BBW for at least one link in said first network set of links.

19. The method of claim 17 wherein said scalar specifies a sufficient amount of bandwidth needed for at least one link in said first network set of links to protect against a failure of at least one SRLG in said fifth set of SRLGs.

20. The method of claim 17 wherein said active bandwidth allocation specifies the amount of active bandwidth on at least one SRLG in said first network set of SRLGs that is protected by at least one link in said first network set of links.

21. The method of claim 17 wherein an SRLG-disjoint AP and BP have been selected and at least one link in said first BP set of links has been assigned a respective BBW; and, said method further comprising: adjusting said respective BBW.

22. The method of claim 21 wherein for a link in said first BP set of links: a first BBW is equal to an amount of BBW needed to backup all active links in said first network set of links and a second BBW is equal to a total BBW for at least one BP traversing said link in said first BP set of links; and, wherein adjusting said respective BBW further comprises adjusting said respective BBW to equal the difference between said first BBW and said second BBW.

23. The method of claim 22 wherein said link in said first BP set of links further comprises a residual bandwidth and said difference is greater than zero; and,
said method further comprising: increasing said second BBW by said difference and decreasing said residual bandwidth by said difference.

24. The method of claim 1 wherein forming the first BP connecting the first and second nodes in the optical network includes forming the first BP fully SRLG-disjoint with the second AP.

25. The method of claim 1 wherein the first BP includes a BP set of links and at least one link in the BP set of links shares at least one SRLG with a link from the first AP set of links, the method further including:
determining, for at least one link in the first AP set of links, respective SRLGs with respect to at least one link in the BP set of links, and
identifying a link from the first set of AP links that shares a largest number of the respective SRLGs with a largest number of links in the BP set of links.

26. The method of claim 1 wherein the first BP includes a BP set of links and at least one link in the BP set of links shares at least one SRLG with a link from the first AP set of links, the method further including:
determining all SRLGs to which the first set of AP links belong;
for at least one link in the first AP set of links, determining a number of SRLGs to which said at least one link and at least one link from the BP set of links belong; and
selecting a link in the first AP set of links with the largest number of said number of SRLGs.

27. A method comprising:
determining that a backup path (BP) is shared risk link group (SRLG)-joint with an active path (AP), wherein said AP comprises a first set of links and connects first and second nodes in an optical network and said BP connects said first and second nodes;
identifying the highest risk link in said first set of links;
removing said highest risk link from said AP to form a second set of links;
reforming the AP, from at least a portion of the second set of links, to connect the first and second nodes; and,
repeating said determining, identifying, removing, and reforming until said BP is SRLG-disjoint with said AP.

28. A method comprising:
determining that a backup path (BP) is shared risk link group (SRLG)-joint with an active path (AP), wherein said AP comprises a first set of links and connects first and second nodes in an optical network and said BP connects said first and second nodes;
identifying highest risk link in said first set of links;
removing said highest risk link from said AP to form a second set of links;
reforming the AP, from at least a portion of the second set of links, to connect the first and second nodes;
wherein said optical network comprises a BP set comprising every BP connecting said first and second nodes; and,
repeating said determining, identifying, removing, and reforming until every BP in said BP set is found to be SRLG-joint with said AP.

29. The method of claim 28 wherein a second set of link forms said optical network, and further comprising:
determining a cost for at least one link in said second set of links, wherein said cost is determined with respect to SRLGs shared by a second AP; and,
selecting a second BP comprising a third set of links, wherein said third set of links are selected to minimize a total cost for said third set of links.

30. A survivable optical network with an active path (AP) and a corresponding backup path (BP), the network comprising:
a first network set of links formed by:
determining that no BP is shared risk link group (SRLG)-disjoint with a first AP, the first AP having a first set of links and connecting first and second nodes in the network;
form a first BP connecting the first and second nodes in the optical network, wherein the first BP is partially SRLG-disjoint with the first AP;
forming a set of risk links selected from said first set of links;
identifying the highest risk link among the set of risk links; and
replacing the highest risk link with a link from the optical network to form a second AP connecting the first and second nodes in the optical network.

31. The survivable optical network in claim 30 wherein at least one link in said first network set of links comprises a respective cost with respect to said first AP.

32. The survivable optical network in claim 31 wherein said network further comprises a first set of SRLGs formed from at least one SRLG in said network sharing a link from said first set of links; said network further comprising:
a second network set of links, wherein at least one link in said second network set of links shares an SRLG in said first set of SRLGs; and,
wherein at least one link in said second network set of links is associated with a respective cost.

33. The survivable optical network in claim 32 further comprising:
a third network set of links, wherein at least one link in said third network set of links is separate from at least one SRLG in said first network set of SRLGs; and,
wherein at least one link in said third network set of links comprises a respective cost.

* * * * *